US007247259B2

(12) United States Patent
Erkey et al.

(10) Patent No.: US 7,247,259 B2
(45) Date of Patent: Jul. 24, 2007

(54) PROCESSES FOR MAKING AEROGEL-ELECTROLYTE-METAL COMPOSITES

(75) Inventors: Can Erkey, South Windsor, CT (US); Hiroaki S. Hara, West Hartford, CT (US)

(73) Assignees: Aerogel Composite, LLC, Bloomfield, CT (US); University of Connecticut, Farmington, CT (US)

( * ) Notice: Subject to any disclaimer, the term of this patent is extended or adjusted under 35 U.S.C. 154(b) by 112 days.

(21) Appl. No.: 11/098,095

(22) Filed: Apr. 4, 2005

(65) Prior Publication Data
US 2006/0116463 A1      Jun. 1, 2006

Related U.S. Application Data

(60) Provisional application No. 60/567,678, filed on Apr. 30, 2004, provisional application No. 60/559,248, filed on Apr. 2, 2004.

(51) Int. Cl.
| H01B 1/02 | (2006.01) |
| H01B 1/04 | (2006.01) |
| B05D 5/00 | (2006.01) |
| B05D 3/02 | (2006.01) |
| B05D 7/00 | (2006.01) |

(52) U.S. Cl. ................ 252/518.1; 252/502; 252/519.2; 252/519.33; 252/500; 427/243; 427/229; 427/217; 427/220

(58) Field of Classification Search ............... 252/500, 252/502, 518.1, 519.2, 519.33; 427/243, 427/229, 217, 220
See application file for complete search history.

(56) References Cited

U.S. PATENT DOCUMENTS

| 3,203,903 | A | * | 8/1965 | Van Olphen ................. 252/62 |
| 5,358,802 | A | * | 10/1994 | Mayer et al. ............ 429/231.8 |
| 5,538,931 | A | * | 7/1996 | Heinrichs et al. ........... 502/234 |
| 6,303,046 | B1 | * | 10/2001 | Risen et al. ................... 252/1 |
| 6,695,986 | B1 | * | 2/2004 | Rolison et al. .......... 252/521.3 |
| 2002/0016397 | A1 | | 2/2002 | Risen, Jr. et al. ............ 524/492 |

OTHER PUBLICATIONS

International Search Report of PCT/US2005/011249 dated Oct. 5, 2006.

* cited by examiner

*Primary Examiner*—Mark Kopec
*Assistant Examiner*—Jaison Thomas
(74) *Attorney, Agent, or Firm*—McCormick, Paulding & Huber LLP

(57) ABSTRACT

A process for making an aerogel-electrolyte-metal composite includes contacting an aerogel with an electrolyte to form an aerogel-electrolyte composite; contacting the aerogel-electrolyte composite with a metal precursor to form an aerogel-electrolyte-precursor composite; and converting the metal precursor of the aerogel-electrolyte-precursor composite to metal crystals to form the aerogel-electrolyte-metal composite. In addition, an aerogel-electrolyte-metal composite is formed by the process, wherein the average longest dimension of the metal crystals is about 1 to about 3 nanometers, and wherein the metal crystals are about 30% to about 100% dispersed.

24 Claims, 1 Drawing Sheet

PROCESSES FOR MAKING AEROGEL-ELECTROLYTE-METAL COMPOSITES

CROSS REFERENCE TO RELATED APPLICATIONS

The present application claims the benefit of U.S. Provisional Application Ser. No. 60/559,248, filed on Apr. 2, 2004 and U.S. Provisional Application Ser. No. 60/567,678, filed on Apr. 30, 2004, both of which are incorporated herein in their entireties.

BACKGROUND

This disclosure generally relates to processes for making composites comprising at least one metal or metal alloy and an electrolyte associated with a support, and more specifically processes suitable for making an aerogel-electrolyte-metal composite.

Supported metals find utility in a wide range of applications, for example as electrodes and/or catalysts. Known supports include aerogels, which are porous materials that may be produced by sol-gel polycondensation reactions. Many aerogels have small inter-connected pores. The chemical composition, microstructure, and physical properties of aerogels may be controlled on the nanometer scale by adjusting the sol-gel processing conditions.

Electrodes have been made from monolithic, granular and microspherical carbon aerogels (also referred to as carbon foams). Such electrodes are used, for example, in energy storage devices such as capacitors and batteries, in fuel cells, e.g., proton exchange membrane (PEM) fuel cells, in electrocapacitive deionization devices, and the like. Fuel cells are believed to be a promising alternative to present power sources because fuel cells are able to convert chemical energy directly into electrical energy with high efficiency and low emission of pollutants. Among various types of fuel cells, PEM fuel cells are particularly attractive because they operate at low temperatures, allow immediate response to changes in the demand for power, and exhibit high efficiencies and power densities.

PEM fuel cell systems are based on a membrane electrode assembly (MEA), which includes a polymer electrolyte (the "membrane") disposed between an anode and a cathode. Hydrogen is channeled to the anode at which it forms hydrogen ions (protons) and electrons in the presence of a metal catalyst. The polymer electrolyte membrane allows only the positively charged ions to pass through it to the cathode. The electrons must travel along an external circuit to the cathode, creating an electrical current. At the cathode, the electrons and positively charged hydrogen ions combine with oxygen to form water, which flows out of the cell.

In PEM fuel cells, precious metals such as platinum are the most active catalysts. Unfortunately, platinum is expensive and electrodes are frequently limited by low platinum utilization (i.e., percentage of platinum that can be accessed by reactants for catalysis). Some applications may tolerate increased platinum concentrations to compensate for the low utilization level. However, in order for PEM fuel cells to be more commercially viable, a reduction in the cost per kilowatt (kW) is desirable. This can be achieved by minimizing the precious metal concentration and/or increasing the precious metal utilization in the electrode.

One approach uses platinum crystals supported on a high surface area carbon, such as an aerogel, rather than pure platinum black crystallites as the catalyst. As used herein, the term "crystals" includes crystalline-like structures, partially crystalline structures and agglomerations of crystals, partially crystalline structures, and/or amorphous or semi-amorphous particles. One difficulty with existing processes for making aerogels comprising metalcrystals is the inadequate control over the manner in which metalcrystals are incorporated. Frequently, composites with inconsistent metal crystal sizes, broad crystal size distributions and poor electrolyte-to-catalyst contact are formed. This has been one of the factors impeding the commercialization of aerogel supported catalysts and/or electrodes, particularly for use as a MEA in a PEM fuel cell.

There accordingly remains a need in the art for improved aerogel-metal composites, particularly carbon aerogel-metal composites, and improved processes for making such composites. It would be particularly beneficial if such composites and processes resulted in decreased metal crystal concentration and/or improved exposure of catalysts to the reactants at the electrolyte/catalyst interfacial region for improved performance and/or reduced cost of fuel cells and other devices using supported electrocatalysts.

BRIEF SUMMARY

In one embodiment, a process for making an aerogel-electrolyte-metal composite comprises contacting an aerogel with an electrolyte to provide an aerogel-electrolyte composite; impregnating the aerogel-electrolyte composite with a metal precursor to provide an impregnated aerogel-electrolyte composite; and converting the metal precursor to metal crystals to provide the aerogel-electrolyte-metal composite.

In another aspect, an aerogel-electrolyte-metal composite is formed by this process, wherein the average longest dimension of the metal crystals is about 1 to about 3 nanometers, and wherein the metal crystals are about 30% to about 100% dispersed.

In another embodiment, a process for making a carbon aerogel-electrolyte composite, comprises immersing carbon aerogel in a solution which contains an electrolyte to impregnate the carbon aerogel with the electrolyte solution; and drying the electrolyte solution-impregnated carbon aerogel to form the carbon aerogel-electrolyte composite.

In a further embodiment, a process for making a carbon-electrolyte-metal composite, comprises immersing carbon aerogel in a solution which contains an electrolyte to impregnate the carbon aerogel with the electrolyte solution, drying the electrolyte solution-impregnated carbon aerogel to form a carbon aerogel-electrolyte composite contacting the carbon aerogel-electrolyte composite to a metal precursor to form a carbon aerogel-electrolyte-metal precursor composite; and converting the metal precursor of the carbon aerogel-electrolyte-metal precursor composite to metal crystals to form the carbon aerogel-electrolyte-metal composite.

In another embodiment, a process of making a carbon aerogel-electrolyte-metal composite, comprises contacting carbon aerogel with a metal precursor to form a carbon aerogel-metal precursor composite; converting the metal precursor of the carbon aerogel-metal precursor composite to metal crystals to form a carbon aerogel-metal composite; immersing the carbon aerogel-metal composite in solution which contains electrolyte to impregnate the carbon aerogel-metal composite with the solution; and drying the impregnated carbon aerogel-metal composite to form a carbon aerogel-electrolyte-metal composite.

The above described methods and other features are exemplified by the following figures and detailed description.

DETAILED DESCRIPTION

Figure 1:
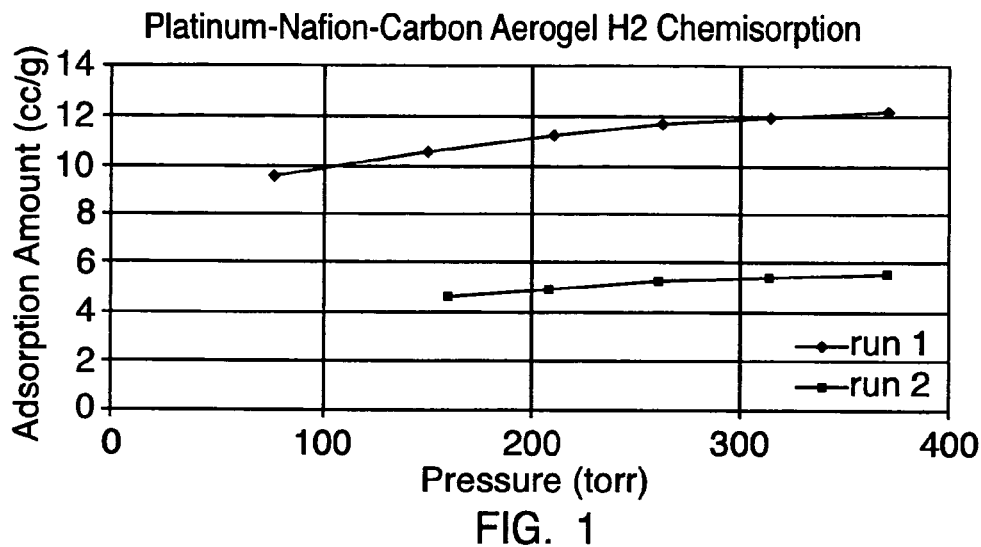
FIG. 1 is a graph of a chemisorption study of an aerogel-NAFION®-platinum composite made by the method of the present invention.

It has unexpectedly been found that by exposing a support to an electrolyte prior to incorporating a metal into the support, it is possible to provide at least comparable catalytic activity at lower metal concentrations. For example, lower levels of platinum may be incorporated into supports such as aerogels, while still providing equivalent or enhanced performance in catalytic applications, e.g., PEM fuel cells.

Aerogels are particularly advantageous supports, for reasons of cost, ease of production, ability to tailor composition and physical form, and other considerations. The particular type of aerogel used in the composites may be inorganic (e.g., a silica aerogel) or organic (e.g., a resorcinol-formaldehyde aerogel). In one embodiment, organic aerogels may be pyrolyzed to form carbon aerogels. As used herein, the term "aerogel" includes all aerogel forms, including inorganic aerogels, organic aerogels, carbon aerogels, and xerogels (gels formed when hydrogels are air dried instead of supercritically dried). Suitable aerogels for use as supports may have a surface area of at least about 50 to about 2000 square meters per gram ($m^2/g$); a pore volume of about 0.2 to about 10 cubic centimeters per gram ($cm^3/g$); and a density of about 0.01 to about 3.0 grams per cubic centimeter ($g/cm^3$). Suitable carbon aerogels for use as supports may more typically have a surface area of at least about 100 to about 2000 square meters per gram ($m^2/g$); a pore volume of about 0.5 to about 10 cubic centimeters per gram ($cm^3/g$); and a density of about 0.01 to about 2.0 grams per cubic centimeter ($g/cm^3$). Such properties may be readily measured by those skilled in the art. For example, surface area and pore volume may be determined by the BET method; and density may be determined using a pycnometer.

Suitable inorganic aerogels may be obtained by supercritical drying of highly cross-linked hydrogels synthesized by polycondensation of metal alkoxides. Silica aerogels are generally produced from silicon-containing alkoxide precursors such as tetramethyl orthosilicate (TMOS, $Si(OCH_3)_4$), and tetraethyl orthosilicate (TEOS, $Si(OCH_2CH_3)_4$). Other precursors may be selected by those skilled in art to make other inorganic aerogels containing oxides such as silica, alumina, ceria, titania, vanadia, niobia, zirconia, tantala, or combinations comprising at least one of the foregoing oxides.

Organic aerogels may be synthesized by supercritical drying of the gels obtained by the sol-gel polycondensation reaction of monomers such as phenols with formaldehyde or furfural in aqueous solutions. Examples of phenols used to make organic aerogels include resorcinol, phenol, catechol, chloroglucinol, and other polyhydroxybenzene compounds that react in the appropriate ratio with formaldehyde or furfural. Suitable precursor combinations of this type include resorcinol-furfural, resorcinol-formaldehyde, phenol-resorcinol-formaldehyde, catechol-formaldehyde, chloroglucinol-formaldehyde, or combinations comprising at least one of the foregoing precursors. Further details concerning the selection of suitable precursors to make the desired aerogels are available to those skilled in the art. Such materials are commercially available.

The particular process for producing the aerogels may vary greatly and is not critical to this disclosure. In general, in the production of organic aerogels, the reactants are mixed with a catalyst and may include the addition of other metals. A gel formed by polymerization is then dried in a solvent-exchange and extraction step. The resulting organic aerogel is then pyrolyzed in an inert atmosphere to form a carbon aerogel. Specifically, the process to prepare the gels may proceed through a sol-gel polymerization of certain multifunctional organic monomers in a solvent (e.g., water), leading to the formation of highly cross-linked, transparent gels ("hydrogel sol"). For example, in a specific aspect, one mole of resorcinol (1,3-dihydroxybenzene) condenses in the presence of a basic catalyst with two moles of formaldehyde. Suitable catalysts are mildly basic catalysts such as sodium carbonate. In this polymerization, resorcinol is a trifunctional monomer capable of adding formaldehyde in the 2-, 4-, and/or 6-ring positions. The substituted resorcinol rings condense with each other to form nanometer-sized clusters in solution, which crosslink through their surface groups (e.g., —$CH_2OH$) to form the hydrogel sol. Further details of the reaction are available to those skilled in the art, having been previously described, for example, in U.S. Pat. Nos. 4,997,804 and 4,873,218. Other patents that describe the preparation of aerogels include U.S. Pat. Nos. 6,432,886; 6,364,953; 6,307,116; 5,908,896; 5,879,744; 5,851,947 and 5,306,555.

The size of the clusters may be regulated by the concentration of catalyst in the resorcinol-formaldehyde mixture. More specifically, the mole ratio of resorcinol (R) to catalyst (C), R/C, may be used to control the surface area and electrochemical properties of the resulting gel. In one embodiment, the R/C ratio is of about 50 to about 300. Other ratios that may be used to control the properties of the resulting gel include resorcinol to formaldehyde (F), R/F, and resorcinol to water (W), R/W. Generally, the R/F and R/W molar ratios are about 0.01 to about 10.

After the initial formation, the hydrogel sol may be cured for a time and temperature sufficient to stabilize the aerogel structure and form a cured hydrogel. The curing time may be greater than or equal to about 2 hours. Suitable curing temperatures may be about 25° C. to about 150°C. Pressures greater than 1 atmosphere ("atm") may be used to decrease the curing time. For example, after curing, RF aerogels may be dark red or black in color and substantially transparent. The hydrogel may next be dried. If the polymerization solvent is removed from these gels by simple evaporation, large capillary forces are exerted on the pores, forming a collpsed structure (i.e., a xerogel). In order to preserve the gel skeleton and minimize shrinkage, the drying step may be performed under supercritical conditions (described below). Other drying steps may also be conducted, if desired, usually before the supercritical extraction step. For example, it is possible to conduct a solvent-exchange step where the cured hydrogel is contacted with an exchange solvent (e.g., acetone) prior to subjecting the aerogel to supercritical extraction, because water is immiscible with liquid carbon dioxide, a supercritical fluid. Alternatively, or in addition to the exchange step, surfactants may be used to remove water from the cured hydrogel. The highly porous material obtained from this removal operation is the organic aerogel.

By appropriate adjustment of drying conditions, a hybrid structure having characteristics of both a xerogel and an aerogel may be produced. For example, such a hybrid may be produced as a result of a partial evaporation of the gel solvent under conditions promoting xerogel formation followed by evaporation of the remaining solvent under conditions promoting aerogel formation. The resulting hybrid structure would then be dried under supercritical conditions and pyrolyzed. Preparation of other xerogel-aerogel hybrids may be produced by first evaporating under conditions promoting aerogel formation and completing the evaporation under xerogel-promoting conditions.

As noted above, one means for removing water from the hydrogel to form an organic aerogel is by extraction of the gel under supercritical conditions. As used herein, the terms "supercritical fluid", "supercritical solution", and "supercritical solvent" are intended to be synonymous and refer to a fluid wherein the temperature and pressure of the fluid are greater than the respective critical temperature and pressure of the fluid. A supercritical condition for a particular fluid refers to a condition in which the temperature and pressure are both respectively greater than the critical temperature and critical pressure of the particular fluid.

Also as used herein, a "near-supercritical fluid" is a fluid wherein the reduced temperature (actual temperature measured in Kelvin divided by the critical temperature of the solution (or solvent) measured in Kelvin) and reduced pressure (actual pressure divided by critical pressure of the fluid) of the fluid are both greater than about 0.8 and less than about 1.0 (i.e., the fluid is not a supercritical fluid). A near-supercritical condition for a particular fluid refers to a condition in which the reduced temperature and reduced pressure are both respectively greater 0.8 but the condition is not supercritical. Under ambient conditions, the fluid may be a gas or liquid. The term fluid is also meant to include a mixture of two or more different individual fluids. As used herein, the term "supercritical fluid" and "supercritical conditions" are intended to include near supercritical fluids and near supercritical conditions respectively.

Supercritical fluids may include, for example, solvents such as carbon dioxide, ethane, propane, butane, pentane, dimethyl ether, ethanol, water, and combinations comprising at least one of the foregoing solvents. Carbon dioxide is a solvent that is specifically used herein as a supercritical fluid. For example, at 333° K and 150 atm, the density of $CO_2$ is 0.60 g/cm$^3$; therefore, with respect to $CO_2$, the reduced temperature is 1.09, the reduced pressure is 2.06, and the reduced density is 1.28. Carbon dioxide is an exemplary supercritical fluid. Its critical temperature (31.1° C.) is close to ambient temperature and thus allows the use of moderate process temperatures (e.g., less than 80° C.).

The temperature and pressure of the extraction process depend on the choice of supercritical fluid. The temperature may be less than 350° C., more typically less than about 250° C., and often less than about 100° C., while the pressure may be about 50 atm to about 500 atm. The time for supercritical drying depends on the thickness of the gel. Further details concerning the selection of suitable supercritical fluids and extraction conditions are readily available to those skilled in the art.

In cases where the cured hydrogels are of sufficiently high density, such as greater than about 40 weight percent (wt. %) solids, the pore network may have sufficient inherent strength to withstand the drying process without resort to supercritical drying conditions. Thus, carbon dioxide may be bled from the vessel under non-supercritical conditions. Non-supercritical drying is desirably because of reduced processing time. To maximize crosslinking and further increase the density of the gels, an optional cure cycle may be used.

Following the solvent-exchange/extraction step and any cure cycle, the organic aerogel may be pyrolyzed at elevated temperatures of about 400° C. to about 2000° C., generally in an inert atmosphere of nitrogen, argon, neon, or helium to form a carbon aerogel monolith. The pyrolysis temperatures may affect the surface area and structure of the pyrolized aerogel monolith. In particular, higher surface areas are achieved at lower temperatures. The resulting aerogels, independent of the procedure by which they are pyrolyzed, are frequently black and not transparent owing to the visible absorption properties of the carbon matrix.

As stated previously, the support or aerogel may be contacted with an electrolyte prior to incorporation of a substantial portion of the metal crystals. It is to be understood that metal crystals may be incorporated into the support deliberately, or as a result of the process used to manufacture the support Such supports may be used in the present processes, provided that a substantial portion (e.g., greater than about 25 wt. %, specifically greater than about 50 wt. %, and more specifically greater than about 80 wt. %) of the metal crystals is incorporated into the support after the electrolyte.

Suitable electrolytes include polymer electrolytes including for example ion exchange resins. The resins include ionic groups in their polymeric structure, one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials. The ion exchange resins can be prepared by polymerizing a mixture of components, one of which contains an ionic constituent. One broad class of cation exchange, proton conductive resins is the so-called sulfonic acid cation exchange resin having hydrated sulfonic acid radicals attached to the polymer backbone by sulfonation. A specific type is a perfluorinated sulfonic acid polymer electrolyte, an example of which is a commercial sulfonated perfluorocarbon, in the form of a 5 wt. % solution in water sold by E.I. Dupont de Nemours & Co. under the trade designation NAFION®.

The support or aerogel may be contacted with the electrolyte by any suitable method, for example dipping the support in a solution of the electrolyte, or brushing a solution of the electrolyte onto the support. Where a solution of electrolyte is used, the solvent or suspending agent may optionally be removed prior to incorporation of the metal.

It was unexpectedly found that immersing a carbon aerogel monolith in the electrolyte solution achieves good penetration of the electrolyte. Thus, in one specific embodiment, the aerogel is immersed in a solution of the electrolyte. Suitable solvents include lower alcohols (e.g., isopropanol) and/or water. Suitable amounts of electrolyte in the solution and times of contacting will depend on factors such as the particular electrolyte used and the desired loading, and may be readily determined by those skilled in the art without undue experimentation. The electrolyte may be present in the solution in an amount of about 1 to about 90 wt. % of the total weight of the solution. Generally, the electrolyte may be present in the solution in an amount of about 5 to about 90 wt. % of the total weight of the solution. In one embodiment, a carbon aerogel monolith is immersed in a solution of NAFION® for about 1 hour to several days.

Upon removal from the electrolyte solution, the support-electrolyte composite may be dried, optionally first with an absorbent product, followed by evaporative drying (e.g., in a vacuum oven). Suitable drying temperatures will depend on the composition of the support and the electrolyte, and may be, for example, about 30° C. to about 100° C. The temperature advantageously will not result in decomposition of the support or electrolyte. Suitable drying times may vary greatly (e.g., about 1 hour to about 48 hours).

The amount of electrolyte associated with the support will depend on a number of factors including the type of electrolyte, the anticipated use of the composite, the nature of the support, cost, and like considerations, and is readily determined by one of ordinary skill in the art without undue experimentation. NAFION®, for example, may be used at loadings of about 1 to about 40 wt. %, more specifically at at loadings of about 1 to about 30 wt. %, and even more specifically at loadings of about 5 to about 20 wt. %, based on the total weight of the support-electrolyte composite.

After formation of the support-electrolyte composite, metal is incorporated to form an aerogel-electrolyte-metal composite. In one embodiment, the metals are catalytically active, although the composites are not limited to particular metals. Suitable metals include iron, cobalt, magnesium, molybdenum, nickel, titanium, tungsten, chromium, copper, platinum, osmium, gold, silver, rhodium, ruthenium, palladium, iridium, or the like, or combinations (including alloys) comprising at least one of the foregoing metals.

Excellent dispersion of the metal crystals, as well as narrow crystal size distribution, may be achieved by first depositing a metal precursor on the support-electrolyte composite, followed by conversion of the metal precursor to metal crystals. Suitable metal precursors include metal complexes and metal salts, which are convertible to metal crystals either by thermal decomposition of the complex or reduction of the metal complex or salt. Desirably, the decomposition temperatures are sufficiently low (e.g., less than about 200° C.), to avoid decomposition of the electrolyte.

The metal precursor may be provided in the form of an organometallic compound (i.e., the desired metal bound to one or more organic ligands). Examples of useful organometallic compounds include beta-diketonates (e.g., $Cu(hfac)_2$ or $Pd(hfac)_2$, where "hfac" is an abbreviation for 1,1,1,5,5,5-hexafluoroacetylacetonate), acetoacetonates, tetramethylethyl diamines, beta-ketoiminates, dialkylmides, alkyls (e.g., $Zn(ethyl)_2$ or dimethyl(cyclooctadiene)platinum (II) ("$CODPtMe_2$"), allyls (e.g. bis(allyl)zinc or $W(\pi 5\text{-allyl})_4$), dienes (e.g., $CODPtMe_2$), or metallocenes (e.g., $Ti(\pi 5\text{-}C_5H_5)_2$ or $Ni(\pi 5\text{-}C_5H_5)_2$). Specific organometallic compounds include dimethyl(cyclooctadiene)platinum (II), tetraamine platinum (II) chloride, platinum(II)hexafluoroacetylacetone, (trimethyl) methylcyclopentadienylplatinum(IV), bis(cyclopentadienyl) ruthenium, bis(ethylcyclopentadienyl)ruthenium(II), bis(pentamethylcyclodienyl) ruthenium, (methylcyclopentadienyl)(1,5-cyclooctadiene)iridium(I), and combinations comprising at least one of the foregoing organometallic compounds. Other useful organometallic compounds may be readily determined by those skilled in the art Many suitable organometallic compounds are commercially available, or may be synthesized by means known to those of ordinary skill in the art. In one specific embodiment, the organometallic compound is $CODPtMe_2$, which has a thermal decomposition temperature of about 150° C. This temperature is sufficiently low enough to avoid degradation of many different types of polymeric electrolytes during conversion of the organometallic compound to the aerogel-electrolyte-metal composite. NAFION®, for example, decomposes at temperatures in excess of about 200° C., and thus may be used with $CODPtMe_2$. Decomposition temperatures are accordingly selected so as to provide thermal decomposition of the metal precursor without significant degradation of the support or electrolyte. Another advantage of reduction at low temperature is that it is possible to get small crystal size, because metal crystals tend to sinter at high temperatures during the process of thermal reduction.

Figure 2:
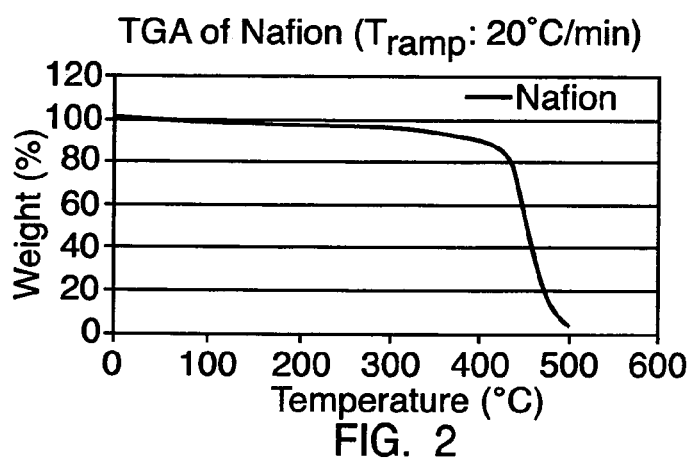
FIG. 2 is a graph of a thermogravimetric analysis of NAFION®.
Figure 3:
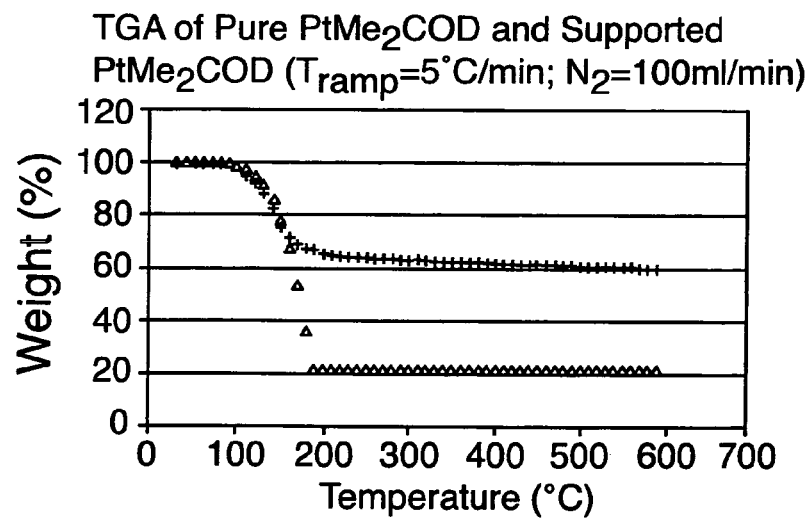
FIG. 3 is a graph of thermogravimetric analyses of $PtMe_2COD$ and carbon support $PtMe_2COD$.

FIG. 2 is the thermogravimetric analysis (TGA) of Nafion, which displays that there is a significant decomposition of Nafion when the temperature is higher than 250° C. FIG. 3 shows the TGA of $CODPtMe_2$. There are two curves in this figure. The curve labeled with diamonds displays the weight loss of $CODPtMe_2$ supported by carbon aerogel and the other curve labeled with triangles displays the weight loss of pure $CODPtMe_2$. Both of these two curves show that almost all of the $CODPtMe_2$ was decomposed around 200° C.

The metal precursor may be deposited on the support-electrolyte composite by means known in the art, for example by dipping or spraying a solution as described above. The precursor may conveniently be deposited using a supercritical fluid as a carrier. The concentration of the metal precursor is sufficient to provide the desired amount of the metal catalyst crystal dispersed in the aerogel. Suitable amounts of times for contacting will depend on factors such as the particular precursor used, the carrier, the characteristics of the support (e.g., porosity) and the desired loading.

In an advantageous feature of the present method, it has been found that use of a reaction reagent to promote the deposition of the metal precursor onto the surface of the aerogel, such as used in chemical vapor deposition or chemical fluid deposition processes, is not necessary. Such reaction reagents include, for example, $H_2$, $H_2S$, $O_2$ or $N_2O$. Generally, the supercritical fluid containing the metal precursor comprises less than 5 wt. %, specifically less than 1 wt. % and more specifically less than 0.1 wt. % of a reaction reagent, based on the total weight of the supercritical fluid, reaction reagent and metal precursor.

Optionally, deposition of the metal precursor may be followed by a chemical conversion to a second metal precursor. For example, it may be desirable to use a first precursor in the deposition process, followed by chemical conversion of the deposited first precursor to provide a second precursor that readily undergoes thermal conversion to the metal crystals. Suitable chemical treatments will be dictated by the particular precursors chosen, and may include, for example, reduction with hydrogen, and the like.

The metal crystals obtained by the above methods have an average crystal size of about 10 nanometers or less, specifically about 8 nanometers or less, more specifically about 5 nanometers or less, and even more specifically about 4 nanometers or less. Even smaller crystals may be obtained such that the average crystal size is about 3 nanometer or less, more specifically about 0.5 to about 2 nanometers or even more specifically about 1 to about 2 nanometers or less. The crystals may be of any shape, for example, spherical plate-like, whiskers, irregular, or the like. As used herein, the term "average crystal size" means the average of each crystal's longest dimension. A specific technique for measuring the average crystal size is to measure the longest dimension of a representative number of crystals from an electron micrograph, e.g., from a transmission electron microscope ("TEM"), and calculate an average. Further details concerning techniques for measuring the average crystal size of the metal crystals are known to those skilled in the art.

Quite surprisingly, it has been found that the electrolyte-aerogel-metal composites may have a very narrow crystal size distribution of the metal crystals. In one embodiment, at least about 50% of the crystals have a largest dimension that may be within 2 nanometers of the average crystal size. Specifically, at least about 80% of the crystals have a largest dimension that may be within 2 nanometers of the average crystal size. Alternatively, at least about 50% of the crystals have a largest dimension that may be within 1 nanometer of the average crystal size. Specifically, at least about 80% of the crystals have a largest dimension that may be within 1 nanometer of the average crystal size. The crystal size distribution may readily be determined by generating a histogram of the crystal sizes from the TEM micrographs described above.

The accessibility of the atoms of metal in metallic catalysts depends on the percentage of the total atoms of metal that are surface atoms, and is often expressed as "percent dispersion". As shown by chemisorption studies, the above methods further provide good crystal dispersion on the support-electrolyte composite. In one embodiment, dispersions of about 33% to about 95% may be obtained and, more spectficially, dispersions of about 33% to about 80% may be obtained. Dispersions of about 40% to about 75% or of about 40% to about 60% may also be obtained. Generally, the metal crystals have a surface area of at least about 50 $m^2/g$, specifically at least about 100 $m^2/g$, more specifically at least about 200 $m^2/g$, and most specifically at least about 300 $m^2/g$.

The particular form of the aerogel-electrolyte-metal composites may vary greatly. The various forms include particles, pellets, films, coatings, fibers, and the like. Likewise, the composites may have a variety of end uses, for example, as catalysts for chemical reactions such as hydrogenation, dehydrogenation, oxidation, isomerization, reforming, hydrocracking, polymerization, or the like; for use in fuel cell MEAs; as electrodes for supercapacitors or rechargeable batteries; as chromatographic packing materials; as adsorbents; as thermal insulators; and the like.

The particular type of support, electrolyte, catalyst, and end use will dictate the relative amounts of each of the foregoing components in the composite, and is readily determined by one of ordinary skill in the art without undue experimentation. For example, an aerogel-electrolyte-metal composite may comprise about 10 to about 95 wt. % of a support and about 5 to about 50 wt. % of an electrolyte, together with about 1 to about 40 wt. % of metal adsorbed to the aerogel-electrolyte composite. More specifically, an aerogel-electrolyte-metal composite may comprise about 10 to about 80 wt. % of a support and about 5 to about 50 wt. % of an electrolyte, together with about 1 to about 30 wt. % of metal adsorbed to the aerogel-electrolyte composite.

As describe above, in one embodiment, the aerogel was immersed in the electrolyte solution prior to contacting the aerogel with a metal precursor. Alternatively, in another embodiment, the aerogel may be immersed in the electrolyte solution after contacting the metal precursor.

Advantageously, the foregoing methods are economical, scalable, and use readily available starting materials. The methods employ low temperatures, which are believed to contribute to the small crystal sizes obtained herein, since metal crystals tend to sinter at higher temperatures. Another advantage is that the high level of dispersion of metal crystals provides for an increased level of catalytic activity, as described above. It is believed that one or more of the improved properties obtainable by the above methods (e.g., small crystal size, narrower crystal distribution, and/or increased dispersion) enhance the catalytic effectiveness of the composites described herein.

The disclosure is further illustrated by the following non-limiting example.

EXAMPLE 1

Four grams (g) of resorcinol were dissolved in 31.30 g water in a test tube. To this solution, 5.949 g of formaldehyde and 0.019 g of sodium carbonate was added and the test tube was shaken until a clear solution was obtained. The test tube was sealed by a rubber stopper. The test tube was kept at ambient temperature for one day, at 50° C. for one day and at 90° C. for three days. After three days at 90° C., the test tube was cooled and a monolith was produced. The monolith was immersed in an acetone bath for two days. Subsequently, supercritical carbon dioxide extraction of acetone was conducted using a high-pressure vessel or autoclave with an internal volume of 54 milliliters (ml), custom manufactured from 316 stainless steel and equipped with two sapphire windows (diameter=1.25 inches (3.175 cm), thickness=0.5 inches (1.27 cm)), sealed on both sides with polyetheretherketone (PEEK) seals.

The vessel was filled with acetone and the monolith was placed in the vessel. The vessel was charged slowly with $CO_2$ from a syringe pump (ISCO, 260D) to 3000 pounds per square inch (psi). At this pressure, the acetone was displaced by liquid $CO_2$ as evident by the transformation from a two-phase to a single-phase system. The vessel was then heated to 50° C. by a recirculating heater/cooler (Fischer) via a machined internal coil. Extraction was continued until no acetone could be detected in the effluent stream. The pressure was controlled by the pump controller (ISCQ, SERIES D). At the end of the extraction period, the vessel was slowly depressurized at 50° C. Once the depressurization was complete, the vessel was opened and the monolith was removed as an RF aerogel. Its weight was recorded and generally the measurements indicated that almost all of the resorcinol and formaldehyde polymerized and very little weight loss occurred during processing.

The RF aerogels were converted to carbon aerogels by pyrolysis in an inert nitrogen atmosphere. An RF aerogel was placed in a quartz tube. The quartz tube was placed into a tube furnace. One end of the tube was in fluid communication with a nitrogen cylinder. The flow rate of nitrogen was adjusted to 100 $cm^3$/min and the temperature of the tube furnace was increased to 1000° C. under flowing nitrogen. The heating rate was approximately 6° C./minute. The tube furnace was maintained at this temperature for six hours. Subsequently, the tube furnace was turned off and cooled overnight under flowing nitrogen.

0.2107 g of the carbon aerogel monolith were immersed into a 5% NAFION® solution (about 10 mL) in a vial for 24 hours. (The 5% NAFION® solution was obtained from Solution Technology Inc., and had an equivalent weight of 1100. The solvent is a mixture of isopropanol and about 10 to 20% water.) The monolith was removed from the vial, the surface was wiped with a tissue, and the weight of the monolith was determined to be 0.7921 g. Subsequently, the monolith was placed inside a vacuum oven under vacuum at about 50° C. overnight. The monolith was then taken out of the vacuum oven and immediately weighed. The final weight of the monolith was 0.2328 g. The loading amount of NAFION® was 0.0221 g (10 wt. %).

Subsequently, 0.12 g of $CODPtMe_2$ (Strem Chemicals, Inc.), a stirring bar and the carbon aerogel-NAFION® monolith (0.2065 g) were put into the pressure vessel used for supercritical extraction described above. The vessel was then sealed, and charged slowly with $CO_2$ at 80° C. to a pressure of 4000 psi. After 24 hours the temperature was decreased to 60° C. At this temperature, the vessel was depressurized into the atmosphere through a restrictor. After the vessel was cooled, the monolith was taken out and weighed; 0.2937 g of the monolith was obtained indicating that 0.0872 g of $CODPtMe_2$ had been adsorbed.

The precursor-loaded monolith was placed in a ceramic tube, which was placed into a furnace (Model: F21 125 Thermolyne Tube Furnace). The precursor in the monolith was decomposed to platinum in the furnace at 200° C., under $N_2$ flowing at 100 cc/mm. The furnace was kept at 200° C. for six hours. Subsequently, the furnace was turned off and cooled with flowing nitrogen gas. Finally, 0.2657 g of the monolith was obtained. This composite structure included 20 wt. % platinum and 8.4 wt. % NAFION®.

$H_2$ chemisorption experiments were carried out at 25° C. using Omnisorp 100 CX equipment. The sample was placed in a sample holder and outgassed at 25° C. for 30 minutes and then reacted with $H_2$ at 160° C. for 1 hour to reduce any oxidized platinum. Subsequently, the system was outgassed at 160° C. for 1 hour under vacuum ($10^{-5}$ bar) and cooled to room temperature. Chemisorption isotherms as shown in the Figure were obtained by incrementally adding hydrogen to the sample flask and measuring the pressures after equilibrium was reached. The isotherm obtained from this measurement was called run 1. After run 1, the sample was evacuated at room temperature for 1 hour and the procedure was repeated to obtain the hydrogen physisorption and weak chemisorption on the sample. The isotherm obtained by this measurement was called run 2. The hydrogen chemisorption amount was determined by extrapolating the isotherms to zero pressure and subtracting the corresponding values. The values of the platinum dispersion were calculated by assuming a hydrogen to platinum stoichiometry (H:Pt) of 1:1. The relevant active surface area of platinum was 163.1 $m^2/g$.

Preliminary TEM analysis indicated a crystallite size around 2 nm with a small crystal size distribution.

As used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges reciting the same physical property are inclusive of the recited endpoints and independently combinable. All publications, patent applications, patents, and other references mentioned herein are incorporated by reference in their entirety. In case of conflict, the present specification, including definitions, will control.

Those skilled in the art will recognize that the disclosure has been described with reference to specific aspects and that other aspects are intended to be within the scope of the claims, which follow. For example, additional materials may be incorporated into the aerogel during its preparation, or incorporated into the aerogel after its formation, to achieve desired properties, e.g., electrical conductivity. In addition, unless otherwise defined, all technical and scientific terms used herein have the same meaning as commonly understood by one of ordinary skill in the art to which this disclosure belongs. Although methods and materials similar or equivalent to those described herein may be used in the practice or testing of the present disclosure, the specific methods and materials are described above.

What is claimed is:

1. A process for making an aerogel-electrolyte metal composite, comprising:
    contacting an aerogel with an electrolyte to form an aerogel-electrolyte composite;
    contacting the aerogel-electrolyte composite with a metal precursor by placing the aerogel-electrolyte composite in a supercritical fluid containing the metal precursor to form an aerogel-electrolyte-precursor composite; and
    converting the metal precursor of the aerogel-electrolyte-precursor composite to metal crystals to form the aerogel-electrolyle-metal composite.

2. The process of claim 1, wherein the aerogel is a carbon aerogel.

3. The process of claim 1, wherein the aerogel comprises silica, alumina, ceria, titania, vanactia, niobia, zirconia, tantala, or a combination comprising at least one of the foregoing oxides.

4. The process of claim 1, wherein the aerogel has a surface area of at least about 50 square meters per gram.

5. The process of claim 1, wherein the aerogel comprises pores that have a pore volume of about 0.3 to about 10 cubic centimeters per gram.

6. The process of claim 1, wherein the aerogel has a density of about 0.01. to about 3.0 grams per cubic centimeter.

7. The process of claim 1, wherein the electrolyte comprises a polymer electrolyte.

8. The process of claim 7, wherein the polymer electrolyte comprises a sulfonated polytetrafluoroethylene ionomer.

9. The process of claim 1, wherein the metal precursor comprises iron, cobalt, magnesium, nickel, titanium, chromium, copper, platinum, gold, silver, rhodium, ruthenium, palladium, iridium, or a combination comprising at least one of the foregoing metals.

10. The process of claim 1, wherein the metal precursor comprises an organometallic compound.

11. The process of claim 1, wherein converting the metal precursor comprises heating the metal precursor to a temperature effective to convert the metal precursor to the metal crystals.

12. The process of claim 11, wherein the temperature is less than about 200° C.

13. A process for making a carbon-electrolyte-metal composite, comprising:
    immersing a carbon aerogel in a solution which contains an electrolyte to impregnate the carbon aerogel with the electrolyte solution;
    drying the electrolyte solution-impregnated carbon aerogel to form a carbon aerogel-electrolyte composite;
    contacting the carbon aerogel-electrolyte composite n a metal precursor by placing the aerogel-electrolyte composite in a supercritical fluid containing the metal precursor to form a carbon aerogel-electrolyte-metal precursor composite; and
    converting the metal precursor of the carbon aerogel-electrolyte-metal precursor composite to metal crystals to form the carbon aerogel-electrolyte-metal composite.

14. The process of claim 13 wherein the heating temperature of the metal precursor is less than the glass transition temperature of the electrolyte.

15. The process of claim 13 wherein converting the metal precursor includes heating the metal precursor to a temperature effective to convert the metal precursor to metal crystals.

16. A process of making a carbon aerogel-electrolyte-metal composite, comprising:
- contacting a carbon aerogel with a metal precursor by placing the aerogel in a supercritical fluid containing the metal precursor to form a carbon aerogel-metal precursor composite;
- converting the metal precursor of the carbon aerogel-metal precursor composite to metal crystals to form a carbon aerogel-metal composite;
- immersing the carbon aerogel-metal composite in solution which contains electrolyte to impregnate the electrolyte into the carbon aerogel-metal composite; and
- drying the electrolyte solution-impregnated carbon aerogel-metal composite to form a carbon aerogel-electrolyte-metal composite.

17. The process of claim 16 wherein the aerogel has a surface area of at least about 400 square meters per gram.

18. The process of claim 16 wherein the aerogel contains pores that have a pore volume of about 0.5 to about 10 cubic centimeters per gram.

19. The process of claim 16 wherein the aerogel has a density of about 0.01 to about 2.0 grams per cubic centimeter.

20. The process of claim 16 wherein the electrolyte includes a polymer electrolyte.

21. The process of claim 20 wherein the polymer electrolyte comprises a perfluorosulfuric acid.

22. The process of claim 16 wherein the metal precursor includes at least one of a metal or metal alloy selected from the group consisting of the transition metal group and the rare earth metal group.

23. The process of claim 16 wherein the metal precursor includes at least one of an organometallic compound or a metallic salt.

24. The process of claim 16 wherein converting the metal precursor includes heating the metal precursor to a temperature effective to convert the metal precursor to metal crystals.

* * * * *